United States Patent [19]

Barron, Jr.

[11] 4,420,314

[45] Dec. 13, 1983

[54] GAS-SOLIDS SEPARATOR

[75] Inventor: Alvah V. Barron, Jr., Birmingham, Ala.

[73] Assignee: Barron Industries, Inc., Leeds, Ala.

[21] Appl. No.: 5,812

[22] Filed: Jan. 23, 1979

Related U.S. Application Data

[63] Continuation of Ser. No. 802,830, Jun. 2, 1977, abandoned.

[51] Int. Cl.³ .............................................. B01D 45/12
[52] U.S. Cl. ....................................... 55/436; 55/449; 55/457
[58] Field of Search .................. 55/348, 436, 449, 457, 55/456, 393; 209/144, 211; 210/512 R

[56] References Cited

U.S. PATENT DOCUMENTS

| | | | |
|---|---|---|---|
| 1,925,373 | 9/1933 | Davies | 55/449 X |
| 2,370,444 | 2/1945 | Bowman | 55/348 |
| 2,402,845 | 6/1946 | Rodman | 55/449 X |
| 2,433,774 | 12/1947 | Madely | 55/457 X |
| 2,461,677 | 2/1949 | Burdock | 55/436 X |
| 2,625,240 | 1/1953 | McBride et al. | 55/348 X |
| 2,936,043 | 5/1960 | Armstrong et al. | 55/457 X |
| 3,085,382 | 4/1963 | Finney, Jr. et al. | 55/457 X |
| 3,420,040 | 1/1969 | Neely et al. | 55/449 X |
| 3,707,830 | 1/1973 | Gustavsson | 55/457 X |

Primary Examiner—Kathleen J. Prunner
Attorney, Agent, or Firm—Willian, Brinks, Olds, Hofer, Gilson & Lione, Ltd.

[57] ABSTRACT

An apparatus for removing particulate matter from gases includes an outer tube having an apertured bottom member, a plurality of stationary vanes for guiding gases into a vortical path through the outer tube, and an inner tube. The inner tube has a smaller diameter than the outer tube and fits partially inside the outer tube. Since the inner tube is arranged coaxially with respect to the outer tube, an annular passageway is defined between them. The passageway end of the outer tube is flared out forming a bell-mouth-shaped lip. A plurality of separate airfoil-shaped vanes, disposed across the passageway have their leading edges above the passageway. The bell-mouth-shaped lip and airfoil-shaped vanes, with their thicker leading edges extending above the passageway, both contribute to a more laminar flow through the passageway, thereby minimizing the pressure drop through the passageway.

3 Claims, 6 Drawing Figures

GAS-SOLIDS SEPARATOR

This is a continuation of application Ser. No. 802,830, filed June 2, 1977 now abandoned.

BACKGROUND OF THE INVENTION

This invention relates to an apparatus for separating solid particles from gases. In particular, it relates to cyclone separators used to remove particulate matter from gases.

In many industrial processes, it is necessary to separate solids, such as particulate matter or dust, from gases in which these are carried or suspended. In many other industrial processes, in order to comply with environmental laws, substantially all particulate matter and dust must be removed from gases before these can be discharged to the atmosphere. As the standards for the discharge of pollutants become stricter, there is an increasing need for efficient removal of dust and other particulate matter from discharged gases. The rising energy costs make it imperative that the separator not only removes the necessary percentage of the solid materials but also achieves such removal with lowest possible energy input.

One type of device used for removal of solids, such as dust and other particulate matter, is a cyclone separator. The ases carrying solids dispersed therein are directed through guiding vanes which impart a vortical or helical path to the gases. As gases travel in a helical path through the device, the solid particles are thrown toward the walls and descend downward along the walls to be collected underneath. One difficulty is the substantial amount of energy which must be expended to move the gas through the apparatus.

The present invention provides an improved device for separating, eliminating, or reducing the amount of solids contained in gases, which device alleviates the problem associated with prior art devices.

Thus, one object of the invention is to provide an apparatus for removing particulate matter from gases, that requires less energy than prior art devices for accomplishing the same task.

Another object of the invention is to provide an apparatus which is more compact than similar prior art devices which achieve the same removal of solids.

A further object of the invention is to provide a solidgas separator which can be easily and efficiently modified for removal of different size particulate matter or modified to account for other changes in operating condition.

Still another object of the invention is to provide a cyclone separator in which worn out or corroded vanes can be easily and efficiently replaced.

A still further object of the invention is to provide an improved apparatus for removing particulate matter, which can be constructed by modifying an existing conventional apparatus.

Other objects of this invention will become apparent to those skilled in the art upon studying this disclosure.

BRIEF DESCRIPTION OF THE INVENTION

In accordance with one aspect of the invention, there is provided an improved apparatus for removing particulate matter from gases. The apparatus includes two coaxial tubes having different diameters. The inner tube fits partially inside the outer tube so that an annular passageway is defined between them. The passageway end of the outer tubular member is bell-mouth-shaped. A plurality of stationary, airfoil-shaped vanes, disposed in the annular passageway, guide the gases passing through the passageway into a vortical path so that particulate matter drifts toward the walls of the outer tube and is collected at the bottom thereof. The gases freed of the particulate matter move upward through the center portion of the outer tube toward the inner tube and exit therethrough. The bell-mouth-shaped end and the airfoil shape of the vanes both contribute to improved laminarity of the flow through the passageway.

DETAILED DESCRIPTION OF THE INVENTION

Figure 1:
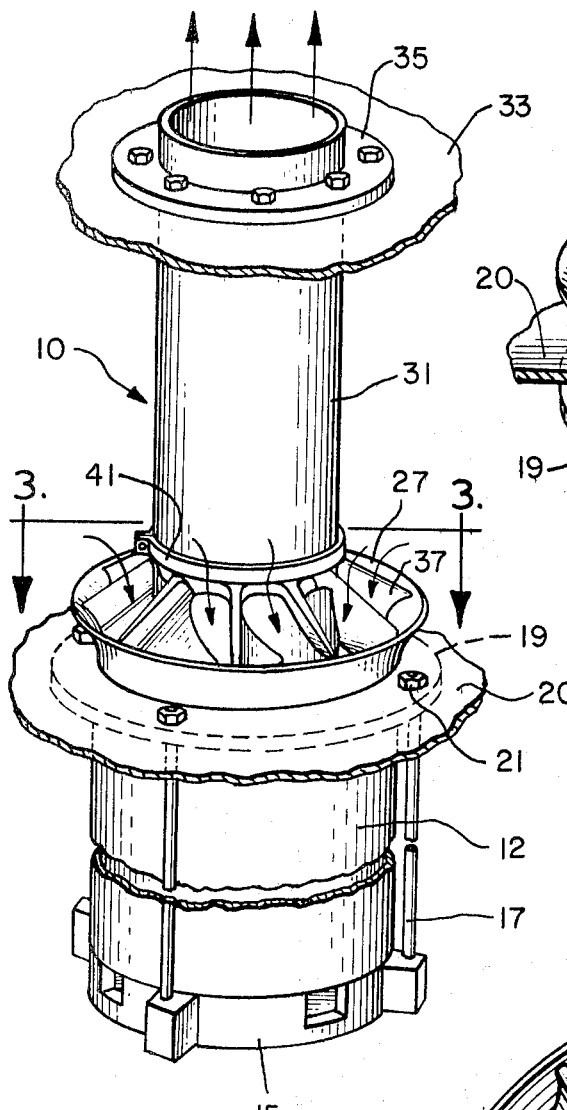
FIG. 1 is a perspective view of a portion of an apparatus for removing particulate matter, constructed in accordance with this invention.

The preferred embodiment of the invention is depicted in the FIGURES. Referring now to FIG. 1, a separator for removing particulate matter from gases is designated generally by a reference numeral 10. In a commercial setting, several such separators are disposed next to one another inside a metal sheet enclosure, forming a cyclone (not shown). A typical cyclone includes an inlet chamber, a separate outlet chamber and a hopper, usually having a conical, or inverted truncated pyramid-shape (not shown), for collection of the removed particulate matter.

Figure 4:
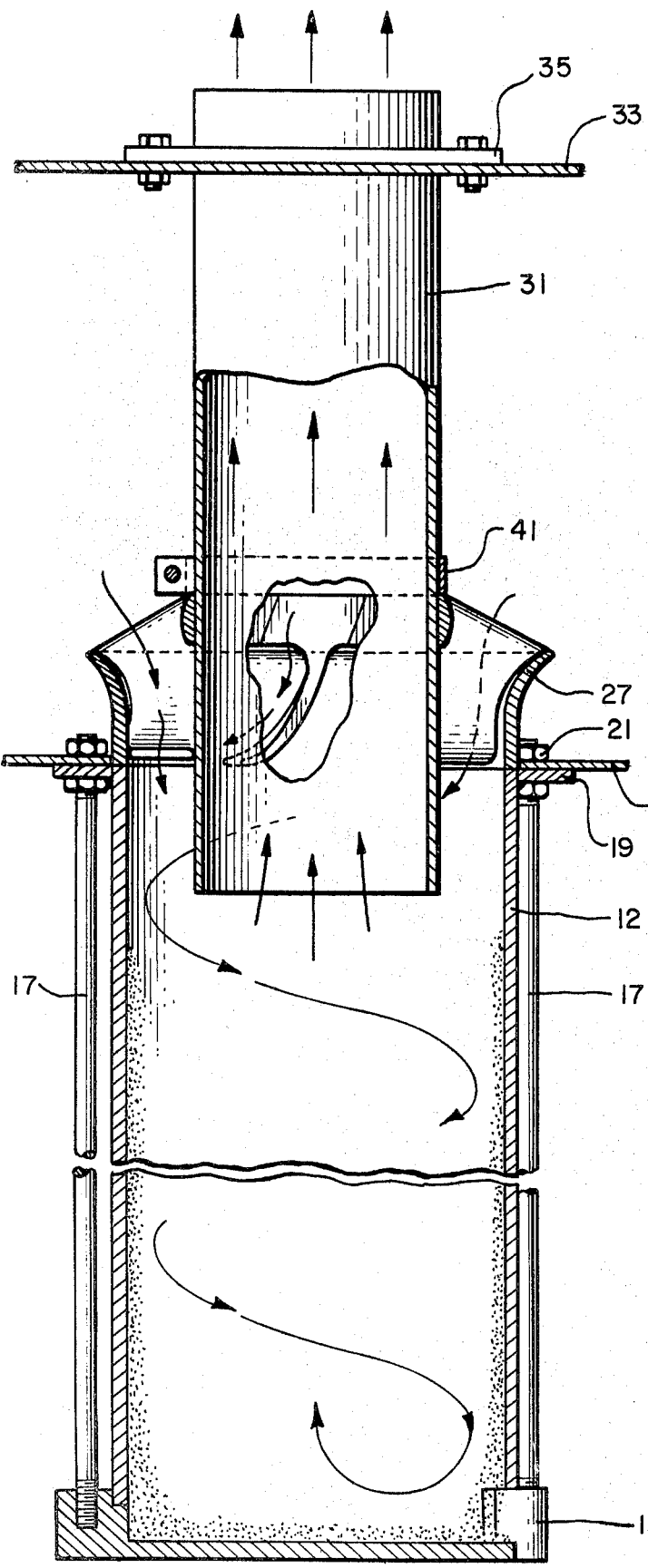
FIG. 4 is a partial cross-sectional veiw of the apparatus constructed in accordance with this invention taken along line 4—4 of FIG. 3.

The separator 10 includes an outer tube 12 having an upper, or a passageway, end and a lower end. An apertured bottom member 15 is mounted to the lower end by removable rods 17 extending from the bottom member 15 through a flange 19 and a metal sheet 20. As shown in FIG. 4, the rods 17 are threaded into the bottom member 15 and are secured to the flange 19 and the metal sheet 20 by nuts 21.

A bell-mouth-shaped, lip 27 can be an integral part of the outer tube 12 or, as shown in FIG. 4, it can be a separate element. The bell-mouth-shaped lip 27 of the preferred embodiment, rests on the upper end of the tube 12. As illustrated in FIG. 4, an inner tube 31 fits partially inside the outer tube 12. The inner tube 31 has an entrance end which fits inside the outer tube 12 and an exit end which extends beyond (upstream of) the bell-mouth-shaped lip 27. The tube 31 is held in position by a metal sheet 33 to which it is mounted by a support flange 35. As can be seen from FIG. 3, the inner tube 31 is coaxial with respect to the outer tube 12, an annular passageway 39 being defined between them.

Figure 2:
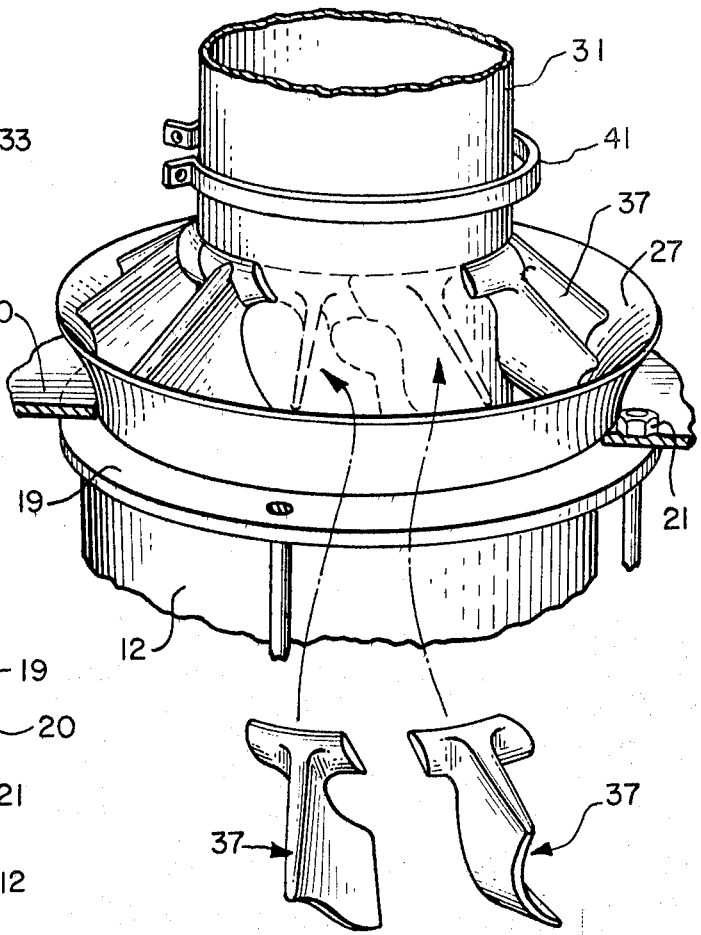
FIG. 2 is an enlarged perspective view of the inlet section of the apparatus depicted in FIG. 1, illustrating the manner in which stationary vanes are secured in the annular passageway.
Figure 3:
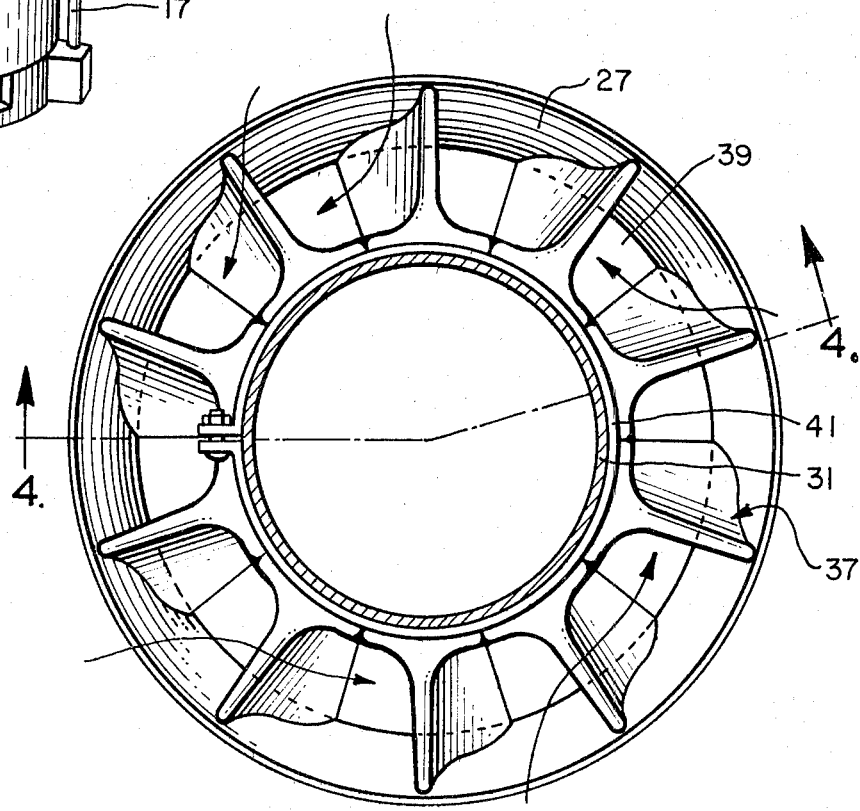
FIG. 3 is a cross-sectional view of the apparatus depicted in FIG. 1 taken along line 3—3 thereof.

A plurality of stationary vanes 37 are disposed across the annular passageway 39 as shown in FIG. 3. Each vane 37 is a separate element. As illustrated in FIG. 4, the vanes 37 rest on the inner surface of the lip 27 and against the outer surface of tube 31. A strap 41, mounted around the tube 31, pushes against tops of vanes 37 thereby holding vanes 37 firmly against the inner surface of the lip 27 and against the outer surface of the tube 31. Each vane 37 is separate and detached from other vanes of the vane assembly. As depicted in FIG. 2 each vane 37 is also not attached to any other part of the apparatus; accordingly, each vane is removable and replaceable without disturbing other vanes of the separator 10.

Figure 6:
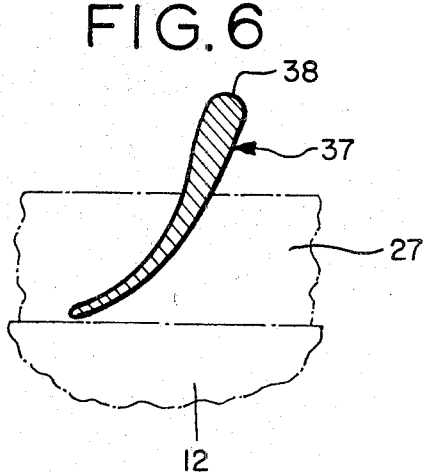
FIG. 6 is a cross-sectional view of the vane of FIG. 5 taken along line 6—6 thereof; the manner in which the vane is arranged with respect to the flared lip and the outer tube is also illustrated.

As shown in FIG. 6, vanes 37 have streamlined, airfoil-shapes. Their leading edges 38 are thicker than the remaining portions of the vanes 37. To assure that the leading edges 38 do not reduce the effective area of the annular passageway 39, the vanes extend above the annular passageway 39 so that the thick portion of each vane 37 is above the passageway 39.

Figure 5:
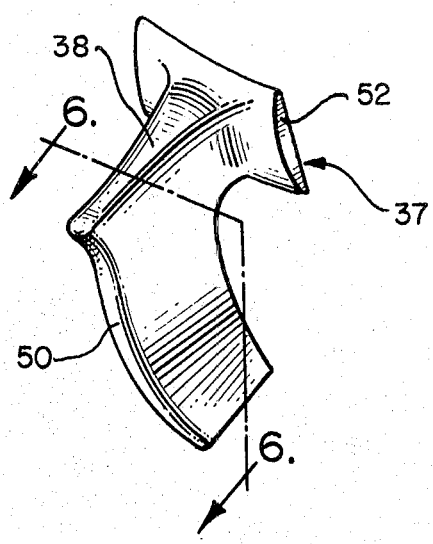
FIG. 5 is a perspective view of a single stationary vane constructed in accordance with this invention.

The overall shape of each vane 37 can be seen in FIG. 5. Each vane 37 includes a streamlined, airfoil-shaped contoured surface 50 and a substantially perpendicular thereto curved surface 52. The contoured surface 50 is rigidly connected on one of its edges to the outer side of the curved surface 52. The inner side of the curved surface 52 has a curvature which corresponds to that of the outer surface of the inner tube 31 so that the inner side of surface 52 mates with the outer surface of the inner tube 31 at substantially all points. The airfoil-shaped cross-section of the contoured surface 50 is substantially parallel to the central axis of the inner tube 31 with which the surface 52 mates. The airfoil shape of the contoured surface 50 is designed to maximize the laminarity of the flow through the passageway 39. The shape of the contoured surface 50 is designed to impart a vortical path to the gases flowing through the annular passageway 39.

Each vane 37, designed for imparting a vortical path to gases, includes a curved surface having an inner side for mating with the outer surface of a tube and an outer side. It also includes a contoured surface for imparting a vortical path to gases. The contoured surface, substantially perpendicular to the curved surface and having an airfoil-shaped cross-section, is rigidly connected on one of its edges to the outer side of the curved surface.

In operation, a gaseous stream containing particulate matter is forced downward through the annular passageway 39. Before even entering the annular passageway 39, the gases come in contact with leading edges 38 of the stationary vanes 37. Thus, the contour of the surface 50 begins to impart a vortical path to gases before they even enter the passageway 39. As the gases flow through the passageway 39, the contoured surfaces 50 of vanes 37 impart vortical path to them, so that the gases follow a vortical path inside the outer tube 12. The centrifugal force tends to throw the particulate matter toward the walls of the outer tube 12 so that the particulate matter descends toward the bottom member 15, whereas the gases substantially free from particulate matter ascend through the central portion of the outer tube 12 and enter the inner tube 31 through which they exit. The gases exiting from the inner tube flow in a commercial cyclone (not shown) to the exit chamber and are directed from there to the atmosphere or, if necessary, for a further treatment (not shown). The particulate matter falls through the apertures in member 15 and is collected in a suitable hopper (not shown).

The separator 10 of this invention can be easily and quickly serviced. If one or more vanes 37 become worn out, corroded or need to be replaced for other reasons, instead of disassembling the entire separator as in a conventional apparatus, the strap 41 is disengaged and individual vanes 37 are replaced as needed. Similarly, depending on the load carried in the gases, the size of particulate matter and other operating conditions, one set of vanes 37 can be quickly replaced by another set designed for the prevailing operating condition. This feature allows operation of the separator 10 at the maximum efficiency regardless of the operating condition.

It should be noted that a conventional separator can be easily modified to achieve the advantages of the present invention. The conventional one-piece vane assembly is removed. The lip 27 is placed on the outer tube 12 and a separate set of vanes 37 of this invention is placed across the annular passageway 39 in the manner described above. The strap 41 is then secured around tube 31 in such position as to hold the vanes 37 resting tightly against the inner wall of the lip 27 and against the outer surface of the inner tube 31.

Many changes and modifications will occur to those skilled in the art upon studying this disclosure. All such changes and modifications that fall within the spirit of the invention as defined in the claims are intended to be included within its scope.

I claim:

1. A single vane for inclusion in a vane assembly for imparting a vortical path to gases, each of said vanes being removable independently of the other vanes and attached neither to the other vanes nor to the other parts of an apparatus for removal of particulate matter from gases, said vane comprising:
    a curved surface having an inner side for mating with the outer surface of a tube and an outer side; and
    a contoured surface for imparting a vortical path to gases, said contoured surface being substantially perpendicular to said curved surface and having an airfoil-shaped cross-section, said contoured surface being rigidly connected on one of its edges having a substantially airfoil-shaped cross-section to the outer side of the curved surface, the airfoil-shaped cross-section being substantially parallel to the central axis of the tube with which the curved surface is mating.

2. An apparatus for removing particulate matter from gases which comprises:
    an outer tube having a tube section and a bell-mouth-shaped lip forming its upper end;
    an inner tube having an entrance end and an exit end, said inner tube being coaxial with respect to said outer tube, said entrance end extending partially into said outer tube and said exit end extending beyond said upper end;
    a plurality of stationary, airfoil-shaped vanes, secured next to one another around an annular passageway defined between said inner tube and said outer tube and spaced apart sufficiently to permit gases to pass between them, each vane being a separate element removable and replaceable without disturbing other vanes of said apparatus, said vanes having leading edges substantially thicker than the remaining portion of said vanes, said leading edges extending upstream of said passageway, said vanes being shaped for imparting a vortical path to gases passing through said annular passageway, said bell-mouth-shaped upper end and said airfoil-shaped vanes with their thick edges extending above the passageway improving laminarity of flow through said annular passageway.

3. An apparatus for removing particulate matter from gases which comprises:

an outer tube having a tube section and a bell-mouth-shaped section forming an upper end;

an inner tube having an entrance end and an exit end, said inner tube being coaxial with respect to said outer tube, said entrance end extending partially into said outer tube and said exit end extending beyond said upper end;

a plurality of stationary, streamlined, airfoil-shaped vanes secured next to one another around an annular passageway defined between said inner tube and said outer tube and spaced apart sufficiently to permit gases to pass between them, each vane being a separate element removable and replaceable without disturbing other vanes of said apparatus, and each vane being wedged against an inner surface of said upper end and against an outer surface of said inner tube, said vanes having leading edges substantially thicker than the remaining portion of said vanes, said leading edges extending upstream of said passageway, said vanes being shaped for imparting a vortical path to gases passing therebetween, said streamlined airfoil-shaped vanes with their thick edges extending above the passageway and said bell-mouth-shaped upper end combining to provide an improved laminarity of flow; and a strap around said inner tube upstream of said vanes and in contact with said vanes for holding said vanes wedged tightly against the inner surface of said upper end and against the outer surface of said inner tube.

* * * * *